(12) United States Patent
Simmonds et al.

(10) Patent No.: US 10,795,165 B2
(45) Date of Patent: Oct. 6, 2020

(54) MULTIPLE WAVEGUIDE STRUCTURE FOR COLOUR DISPLAYS

(71) Applicant: BAE SYSTEMS plc, London (GB)

(72) Inventors: Michael David Simmonds, Kent (GB); Rory Thomas Alexander Mills, Kent (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 16/464,028

(22) PCT Filed: Nov. 27, 2017

(86) PCT No.: PCT/GB2017/053552
§ 371 (c)(1),
(2) Date: May 24, 2019

(87) PCT Pub. No.: WO2018/096359
PCT Pub. Date: May 31, 2018

(65) Prior Publication Data
US 2019/0324278 A1      Oct. 24, 2019

(30) Foreign Application Priority Data
Nov. 28, 2016   (GB) .................................. 1620067.7

(51) Int. Cl.
*G03B 21/14* (2006.01)
*G02B 27/01* (2006.01)
*G02B 26/08* (2006.01)
*G02B 27/00* (2006.01)

(52) U.S. Cl.
CPC ..... *G02B 27/0172* (2013.01); *G02B 26/0833* (2013.01); *G02B 27/0081* (2013.01); *G02B 2027/0112* (2013.01)

(58) Field of Classification Search
CPC . G02B 27/01; G02B 27/0081; G02B 26/0833
USPC ........................................................ 385/133
See application file for complete search history.

(56) References Cited

U.S. PATENT DOCUMENTS

| 9,959,818 B2* | 5/2018 | Bohn ..................... G02B 6/003 |
| 10,527,852 B2* | 1/2020 | Karvonen ............ G02B 6/0076 |
| 2003/0218794 A1 | 11/2003 | Takeda et al. |
| 2010/0103498 A1 | 4/2010 | Pan |
| 2011/0242661 A1* | 10/2011 | Simmonds ........... G02B 6/0035 359/567 |

(Continued)

FOREIGN PATENT DOCUMENTS

| CN | 104656259 A | 5/2015 |
| EP | 2196729 A1 | 6/2010 |

(Continued)

OTHER PUBLICATIONS

International Search Report and Written Opinion received for PCT Application No. PCT/GB2017/053552, dated Mar. 13, 2018. 10 pages.

(Continued)

*Primary Examiner* — William C. Dowling
(74) *Attorney, Agent, or Firm* — Finch & Maloney PLLC

(57) ABSTRACT

An optical system for a colour head up display, the optical system being for guiding image light from an image projection system to an exit pupil. First and second waveguides are utilised, each waveguide guiding a predetermined set of wavelengths.

20 Claims, 5 Drawing Sheets

(56) References Cited

U.S. PATENT DOCUMENTS

2015/0160454 A1 6/2015 Bhakta
2018/0082644 A1* 3/2018 Bohn .................... G02B 6/003

FOREIGN PATENT DOCUMENTS

| WO | 2009101236 A1 | 8/2009 |
| WO | 2010067114 A1 | 6/2010 |
| WO | 2018096359 A2 | 5/2018 |

OTHER PUBLICATIONS

2nd International Search Report and Written Opinion received for PCT Application No. PCT/GB2017/053552, dated Jun. 25, 2018. 17 pages.
GB Search Report under Section 17(5) received for GB Application No. 1620067.7, dated Apr. 26, 2017. 4 pages.
GB Search Report under Section 17(6) received for GB Application No. 1620067.7, dated Jun. 26, 2017. 2 pages.

* cited by examiner

MULTIPLE WAVEGUIDE STRUCTURE FOR COLOUR DISPLAYS

This disclosure relates to optical waveguides and is particularly, but not exclusively, relevant to optical waveguides for head up displays.

Head up displays utilise a transparent component, which the user looks through, to overlay an image on the user's actual view of the surroundings. The user's eye receives light from those surroundings in the normal way, and the user's eye also receives light from the head up display system. An image from the head up display is thus overlaid on the actual surroundings.

The transparent component of a head up display may be either mounted in a fixed position on equipment being used by a user (for example the cockpit of an aircraft), or on the head of the user (for example as a pair of spectacles, or on a helmet) such that the component moves with the user's head and thus remains at a fixed location in relation to the user's eye.

A fundamental requirement of a head up display is to couple light from an image source to the location required for viewing by the user, known as the exit pupil. This may be accomplished utilising a waveguide system as shown schematically in cross section in FIG. 1.

Image projection system 11, 12 projects an image into waveguide 10 which couples the image to a user's eye 1 positioned at the exit pupil of the system. Waveguide body 10 is optically transmissive such that the user views the real world through the waveguide and the image from the projection system 11, 12 is overlaid onto that view.

The projector optics 12 are arranged to distribute the projected image over an input region of the waveguide. The near-field at that region represents the spatial distribution of light across the projector optic's exit pupil, while the far field represents the image information (each pixel of the image is represented by a discrete ray angle). It is desirable for the image displayed to the user (i.e. at the exit pupil) to be focussed a long way from the eye (infinity), since this is the likely focus distance of the real world image onto which the projected image is overlaid.

Input grating 13 couples the ray 14 into waveguide body 10. Input grating 13 may be a diffractive grating which diffracts ray 14 to an angle at which it is trapped within the waveguide 10 by total internal reflection. Output grating 15 diffracts light back to its original angles such that it exits the waveguide and propagates to an exit pupil positioned to coincide with the location of eye 1. The output grating 15 may also be a diffractive grating. Waveguide 10 and the input and output gratings 13, 15 are configured to preserve ray direction between the input and exit pupils to preserve image information. That is, the far field of the light at the exit pupil matches the far field at the input pupil.

For clarity in the figures a single ray 14 is shown, but as will be appreciated this is representative of rays at a range of angles. The input light is also spatially distributed and hence ray 14 also represents rays distributed over the input pupil.

To allow for flexibility in the alignment of the user's eye with the device, the exit pupil should be large enough to accommodate likely positions of the user's eye in use. For example, an exit pupil of greater than 12 mm diameter may be desirable. The waveguide system may be designed to expand the input pupil such that the exit pupil is larger than the input pupil. This expansion is commonly known as pupil replication. The expansion should be performed while preserving the far field and maintaining a constant luminance across the near field.

This expansion may be achieved utilising both diffractive structures 15 and 16 in the waveguide 10. The expansion may be provided in either one dimension or two perpendicular dimensions, using techniques known in the art.

The behaviour of diffraction gratings is wavelength dependent and designing a grating to expand the pupil which operates across a range of wavelengths is challenging. A trade-off between wavelength bandwidth, expansion ratio, and field of view must be made which can limit the overall performance of the waveguide. The provision of colour displays is thus difficult and performance can be limited.

FIG. 2 shows a waveguide structure which attempts to provide improved colour performance. The structure utilises a first waveguide 20 to guide and expand a first set of wavelengths, and a second waveguide 21 to guide and expand a second set of wavelengths. The pupil expansion gratings in each waveguide thus operate over a smaller range of wavelengths enabling improved performance in other aspects. For example, the first set of wavelengths may correspond to Blue/Green colours, and the second set of wavelengths to Green/Red colours.

An image is generated and projected in the same manner as described in relation to FIG. 1, but input coupling grating 22 diffracts a first range of wavelengths into the first waveguide 20 and passes a second range of wavelengths through to the second waveguide 21. Second input coupling grating 23 diffracts the second set of wavelengths into the second waveguide 21. First and second output coupling gratings 24, 25 diffract the relevant wavelengths out of the respective waveguides to an exit pupil at the user's eye 26.

Although such structures allow for a larger spectral bandwidth to be carried by the two waveguides, the design of the first input coupling grating 22 is more challenging because the grating must diffract into both transmissive and reflective orders at specific wavelengths and angles. Consequently the design of this grating limits system performance because of these imposed design parameters.

There is therefore a requirement for a waveguide system providing improved performance across a wide wavelength range.

The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided an optical system for a colour head up display, the optical system being for guiding image light from an image projection system to an exit pupil while maintaining the far field of the guided light, the optical system comprising a first waveguide for guiding a first set of optical wavelengths of the image light, the first waveguide comprising a first input coupling component for coupling light from the projection system into the first waveguide such that it is guided by the first waveguide towards the exit pupil; a second waveguide for guiding a second set of optical wavelengths of the image light, the second waveguide comprising a second input coupling component for coupling light from the projection system into the second waveguide such that it is guided by the second waveguide towards the exit pupil, wherein the first and second input coupling components are offset such that each input coupling component can be independently illuminated by an image projection system.

The first and second input coupling components may be diffraction gratings.

The first and second waveguides may further comprise first and second output coupling components for directing light from the respective waveguides towards the display exit pupil.

The first and second output coupling components may be diffraction gratings.

The optical system may further comprise a single image projection system which illuminates the first input coupling component with image light of the first set of optical wavelengths, and which illuminates the second input coupling component with image light of the second set of wavelengths.

The image projection system may comprise a Digital Micromirror Device (DMD).

The image projection system may further comprise a first light source emitting the first set of optical wavelengths and a second light source emitting the second set of optical wavelengths.

The first and second light sources may each illuminate the whole area of the DMD, and wherein the first and second light sources illuminate the DMD at mutually exclusive angles to the plane of the DMD mirrors.

The first light source may illuminate the DMD over half of the angular input range of the DMD, and the second light source illuminates the DMD over the other half of the angular input range of the DMD.

The guidance axes of the first and second waveguides may be parallel and the first and second input coupling components may be offset along that axis.

The first and second waveguides may be configured to expand the input pupil such that the exit pupil is larger than the input pupil.

The optical system may further comprise a first image projection system which illuminates the first input coupling component with image light of the first set of optical wavelengths, and a second image projection system which illuminates the second input coupling component with image light of the second set of wavelengths.

There is also provided an image projection system, comprising a Digital Mirror Device (DMD) illuminated by first and second light sources, wherein the first and second light sources output first and second sets of wavelengths; and wherein the first and second light sources each illuminate the whole area of the DMD, and wherein the first and second light sources illuminate the DMD at mutually exclusive angles to the plane of the DMD mirrors.

The first light source may illuminate the DMD over half of the angular input range, and the second light source illuminates the DMD over the other half of the angular input range.

The disclosure provided here may provide waveguides which are smaller and lighter than other waveguide designs, but which do not produce stray light paths.

BRIEF DESCRIPTION OF THE DRAWINGS

Embodiments of the invention will be described, by way of example, with reference to the following drawings, in which.

DETAILED DESCRIPTION

Figure 1:
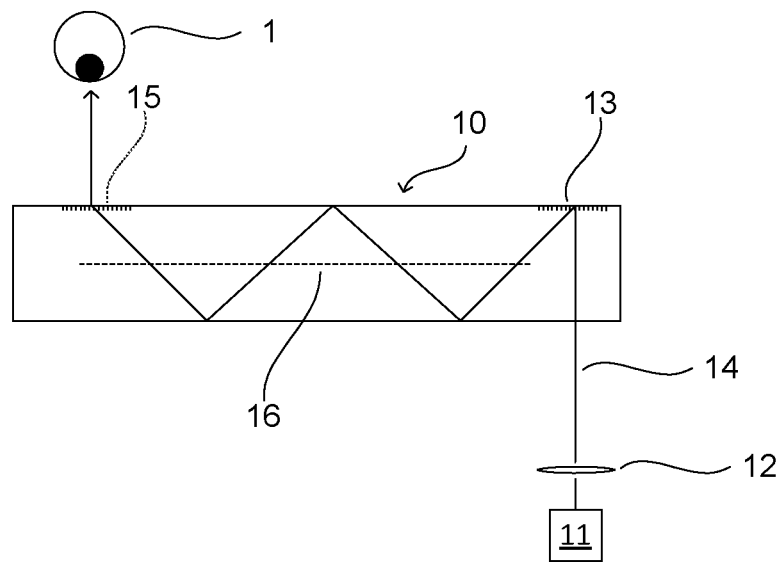
FIG. 1 shows a cross-section of a waveguide structure.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 2:
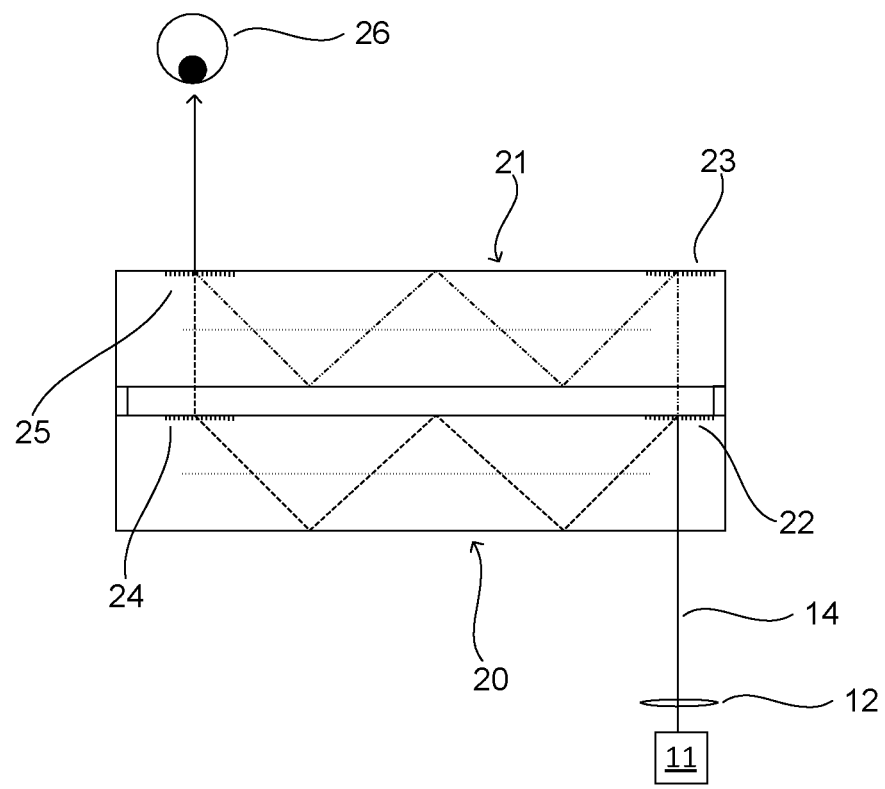
FIG. 2 shows a cross-section of a dual waveguide structure.
Figure 3:
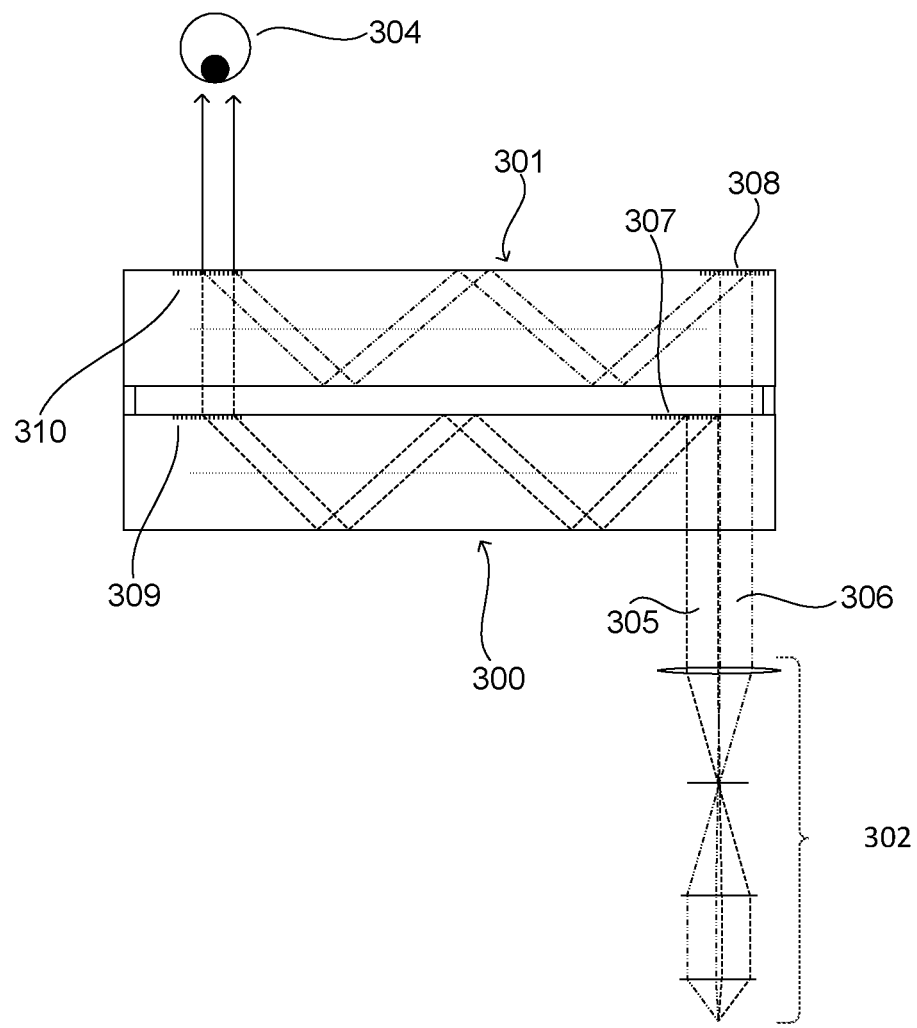
FIG. 3 shows a cross-section of a dual waveguide structure described herein.

FIG. 3 shows a schematic diagram of an optical waveguide system which aims to provide improved colour performance. The optical system of FIG. 3 is related to that of FIG. 2, and utilises two waveguides 300, 301 to guide an image from a projection system 302 to an exit pupil at eye 304. In the system of FIG. 3 a single projection system is utilised to illuminate the inputs of both waveguides in accordance with the following description. In alternative arrangements two projection systems may be utilised, one for each waveguide. The first waveguide 300 carries a first set of wavelengths 305, and the second waveguide 301 carries a second set of wavelengths 306. In FIG. 3 two rays are shown for each wavelength set to indicate the rays at the spatial edges of the pupil. As previously, each shown ray is representative of rays at a range of angles, where each angle represents a particular pixel of the projected image. Waveguides 300 and 301 expand the pupil from the input pupil to the exit pupil as described hereinbefore, but for clarity this is not shown in FIG. 3.

The input coupling gratings 307, 308 are offset from each other such that the input regions for the first and second waveguides do not overlap. However, the output coupling gratings 309, 310 overlap as previously described such that light from both waveguides 300, 301 is overlaid at the exit pupil 304.

Projection system 302 is arranged such that the first set of wavelengths 305 is directed to the first input coupling grating 307 and the second set of wavelengths 306 is directed to the second input coupling grating 308. For example Blue/Green colours may be directed to the first waveguide 300 which is configured specifically for those wavelengths, and the second waveguide 301 may receive Green/Red colours. The projection system 302 projects the full field of view into each waveguide, but only for the relevant colours. At the exit pupil of the waveguide the light from the two waveguides 300, 301 is overlaid and combined thus creating a full colour image at the design eye point.

The offset of the first and second input coupling gratings 307, 308 means that both gratings can be optimised independently to diffract solely into reflective orders, and that the first input coupling grating 307 does not have to be designed to transmit the second set of wavelengths 306 as with previous devices. This relaxes the design requirements for the first input grating thus enabling improved performance.

In an example system, the first waveguide 300 may be utilised for Red/Green wavelengths and the input and output coupling gratings 307, 309 may utilise a grating pitch in the order of 400 nm. The second waveguide 301 may be utilised for Blue/Green wavelengths and the input output coupling gratings 308, 310 may utilise a grating pitch in the order of 300 nm.

In the system of FIG. 3 the axis of propagation from the input coupling gratings to the output coupling gratings are parallel. That is the first and second waveguides guide light along parallel axis. The first and second input coupling gratings are offset along that axis.

Figure 4:
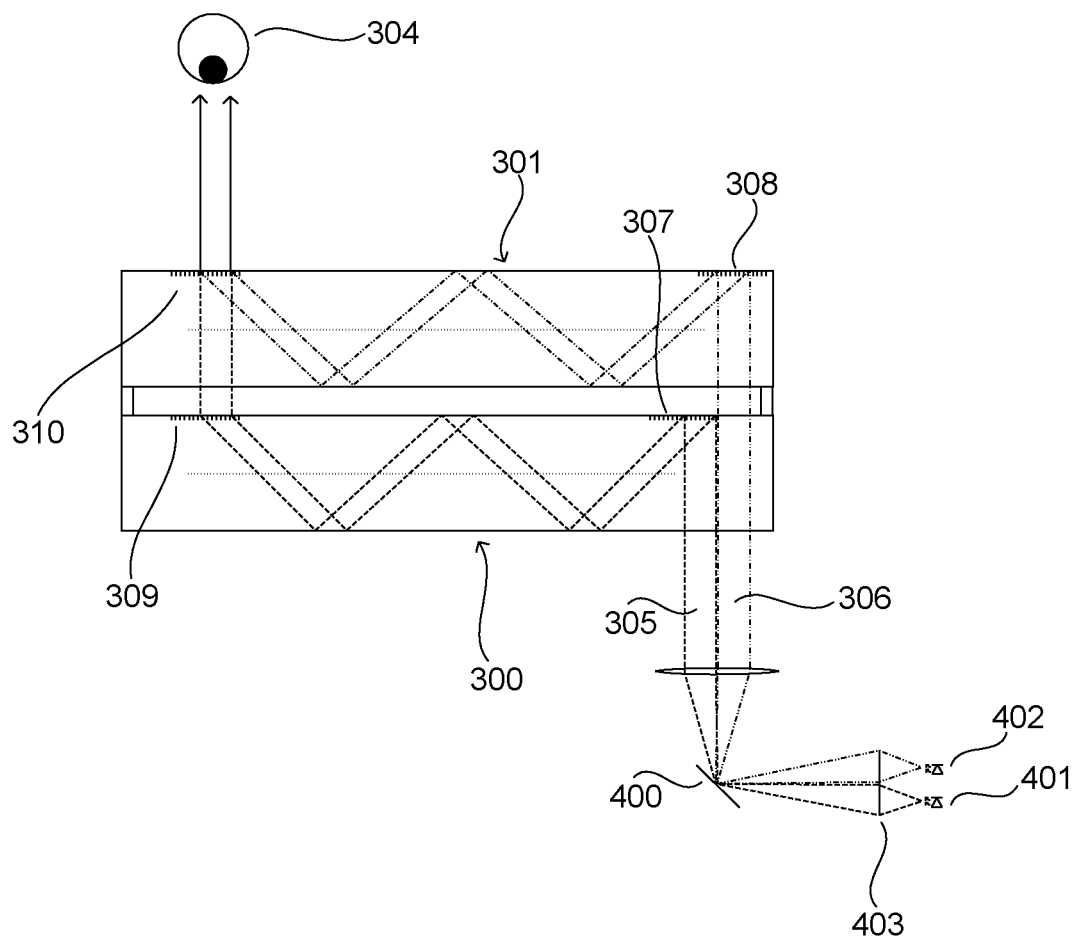
FIG. 4 shows a cross-section of a dual waveguide structure described herein with a DMD image projection system.

FIG. 4 shows a further optical waveguide arrangement utilising a reflective Digital Micromirror Device (DMD) in the projection system to form the image, however alternative technologies such as LCoS and LCDs may be utilised in a similar manner. Numbering from FIG. 3 has been retained where components have equivalent functionality.

DMD 400 is illuminated by two light sources 401, 402, for example LEDs. Each light source 401, 402 emits a spectra corresponding to the first or second sets of wavelengths discussed above. The first and second sets of wavelengths may be mutually exclusive or may overlap.

Each light source 401, 402 may comprise one or more LEDs emitting the required range of wavelengths. For example, the first light source 401 may comprise an LED including a red die and a green die to emit a combination of red and green light. Similarly, the second light source 402 may comprise an LED including a blue die and a green die to emit blue and green light. For example the red die may emit a spectrum centred at 620 nm and the blue die a spectrum centred at 450 nm. The two green dies may emit different wavelengths, for example centred at 550 nm and 520 nm respectively.

Illumination optics 403 are configured to illuminate the whole area of the DMD with each light source 401, 402, but such that each light source fills a discrete cone angle onto the DMD. That is each light source illuminates the DMD at a discrete set of angles to the plane of the DMD mirrors. A typical illumination cone angle for a DMD may be 24° (+12° to −12°). In the system of FIG. 3 one of the light sources may illuminate a cone angle of +12° to 0° and the other light source may illuminate a cone angle of 0° to +12°. Any appropriate illumination lens system may be utilised to provide the required illumination of the DMD. Separate lens systems may be required for each light source to enable correct guidance and focussing.

As will be appreciated, references to illuminating the whole of the DMD refer to illumination of the whole DMD mirror array.

The exit pupil of the projection lens which images the DMD will typically be aligned with the input grating of the waveguides 300, 301. The full field of view from the projector is present over the whole exit pupil for both the first and second sets of wavelengths. However each set of wavelengths will only fill half of the exit pupil of the projector. This is because the full spatial illumination of the DMD by both sets of wavelengths provides the full field of view (spatial position at the DMD translates to field of view angle within the exit pupil, with each ray angle representing a discrete point on the DMD). However, the angles of illumination onto the DMD translate to spatial position at the exit pupil of the projector. Hence, by only illuminating half of the cone angle incident upon the DMD with a light source, only half of the spatial exit pupil created by the subsequent projection lens shall be illuminated. Consequently, the exit pupil of the projector may be divided by colour by illuminating half of the cone angle incident upon the DMD with one set of wavelengths and the alternate half of the cone angle with a second set of wavelengths. As will be appreciated by the foregoing description the exit pupil created by the projector, which is now split spatially in wavelength, can be aligned to the discrete, and spatially displaced input gratings of the waveguides 300, 301.

As explained hereinbefore the waveguides 300, 301 are designed to expand the input pupils and overlay them on one another. A colour image with a common exit pupil is thus created at the design eye point.

Figure 5:
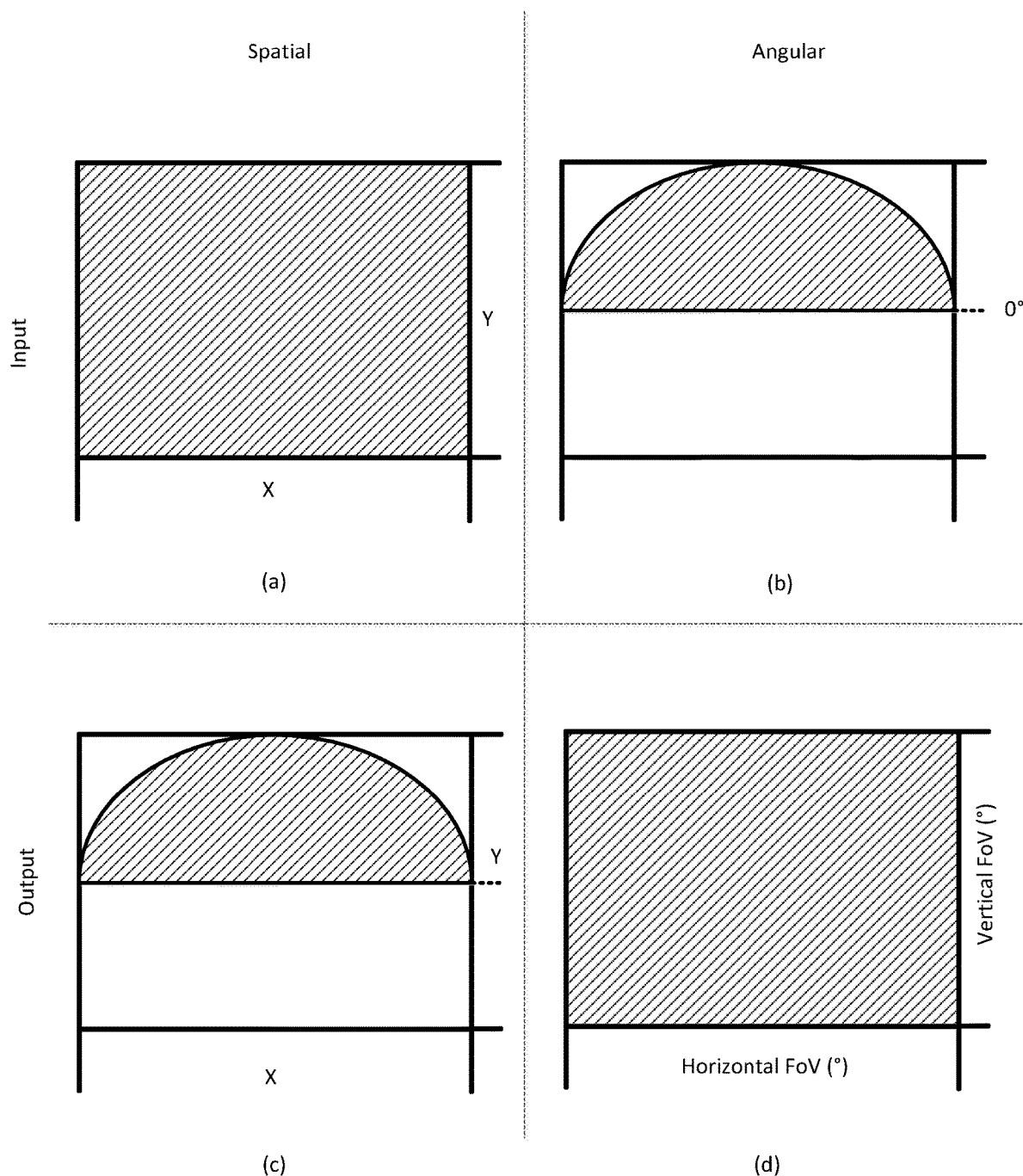
FIG. 5 shows charts of illumination of the systems described herein.

FIG. 5 shows views of the DMD illumination from one of the light sources 401, 402 at the DMD surface (top row) and at its exit pupil (bottom row), spatially (left column) and in angle (right column). As seen in (a) the full surface of the DMD is spatially illuminated, but as shown in (b) the light is constrained to half of the available incident cone angle. The spatial exit pupil (c) created by a projection lens paired to the DMD is now a semi-circle because the angles of illumination are translated to position by the lens. However, a full angular field of view (d) is provided due to the full spatial coverage of the DMD seen in (a) because the spatial position upon the DMD device is translated to field angles created by the lens.

For the second light source, the other half of FIGS. 5(*b*) and 5(*c*) would be illuminated, with the full illumination in (a) and (d) retained.

As in conventional colour sequential systems the dies of the first and second light sources are activated sequentially, with the DMD correctly synchronised such that the correct image frame is created.

The waveguide and illumination structures described hereinbefore thus provide a means to improve the optical performance of colour displays. A separate waveguide is utilised to guide selected sets of wavelengths, thus enabling more optimised design of the input and pupil expansion gratings. The illumination techniques guide the required wavelengths to the relevant waveguide, without reducing the field of view for each set of wavelengths. A specific example of DMD with partial angular illumination is provided, but any suitable image projection system may be utilised including alternative microdisplay technologies (LCoS, LCD, etc.).

In the examples provided above two waveguides are utilised, but more than two waveguides may be used. The input pupil of each waveguide will be offset as described in relation to two waveguides, and each waveguide will be illuminated with, and guide, its specific subset of wavelengths. The illumination schemes described above may be extended to more than two waveguides and sets of wavelengths using the principles discussed herein.

The above description has been given in relation to the provision of a full colour display, but as will be appreciated the same apparatus and techniques may be utilised to provide displays with more restricted colour performance. For example the techniques may still be beneficial for a display for only red and green colours.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. An optical system for a colour head up display, the optical system comprising:
    a first waveguide for guiding a first set of optical wavelengths of image light, the first waveguide comprising a first input coupling component for coupling the first set of optical wavelengths of the image light from the image projection system into the first waveguide such that the first set of optical wavelengths of the image light is guided by the first waveguide towards the exit pupil along an axis of propagation; and
    a second waveguide for guiding a second set of optical wavelengths of the image light, the second waveguide comprising a second input coupling component for coupling the second set of optical wavelengths of the image light from the image projection system into the second waveguide such that the second set of optical wavelengths of the image light is guided by the second waveguide towards the exit pupil along the axis of propagation;
    wherein the first input coupling component of the first waveguide and second input coupling component of the second waveguide are offset from each other along the axis of propagation such that each input coupling component can be independently illuminated by one or more image projection systems.

2. The optical system of claim 1, wherein the first and second input coupling components are diffraction gratings.

3. The optical system of claim 1, wherein the first and second waveguides further comprise first and second output coupling components for directing light from the respective waveguides towards the display exit pupil.

4. The optical system of claim 3, wherein the first and second output coupling components are diffraction gratings.

5. The optical system of claim 1, further comprising a single an image projection system configured to illuminate the first input coupling component with the first set of optical wavelengths of the image light, and to illuminate the second input coupling component with the second set of wavelengths of the image light, wherein the first and second sets of optical wavelengths illuminate the image projection system at mutually exclusive angles to a projection plane of the image projection system.

6. The optical system of claim 5, wherein the image projection system comprises a Digital Micromirror Device (DMD).

7. The optical system of claim 6, wherein the image projection system further comprises a first light source for emitting the first set of optical wavelengths of the image light, and a second light source for emitting the second set of optical wavelengths of the image light.

8. The optical system of claim 7, wherein the first and second light sources each illuminate a whole area of the DMD, and wherein the first and second light sources illuminate the DMD at mutually exclusive angles to a plane of DMD mirrors.

9. The optical system of claim 8, wherein the first light source illuminates the DMD over half of an angular input range of the DMD, and the second light source illuminates the DMD over another half of the angular input range of the DMD.

10. The optical system of claim 1, wherein guidance axes of the first and second waveguides are parallel and the first and second input coupling components are offset along that axis.

11. The optical system of claim 1, wherein the first and second waveguides are configured to expand the input pupil such that the exit pupil is larger than the input pupil.

12. The optical system of claim 1, further comprising a first image projection system which illuminates the first input coupling component with the first set of optical wavelengths of the image light, and a second image projection system which illuminates the second input coupling component with the second set of wavelengths of the image light.

13. An image projection system, comprising:
    a Digital Mirror Device (DMD) illuminated by first and second light sources, wherein the first and second light sources output first and second sets of wavelengths; and
    wherein the first and second light sources each illuminate a whole area of the DMD, and wherein the first and second light sources illuminate the DMD at mutually exclusive angles to a plane of DMD mirrors.

14. The optical system of claim 13, wherein the first light source illuminates the DMD over half of an angular input range, and the second light source illuminates the DMD over another half of the angular input range.

15. An optical system for a colour head up display, the optical system comprising:
    a first waveguide for guiding a first set of optical wavelengths of image light, the first waveguide comprising a first input diffraction grating for coupling the first set of optical wavelengths of the image light from the image projection system into the first waveguide such that the first set of optical wavelengths of the image light is guided by total internal reflection within the first waveguide towards the exit pupil along an axis of propagation; and
    a second waveguide for guiding a second set of optical wavelengths of the image light, the second waveguide comprising a second input diffraction grating for coupling the second set of optical wavelengths of the image light from the image projection system into the second waveguide such that the second set of optical wavelengths of the image light is guided by total internal reflection within the second waveguide towards the exit pupil along the axis of propagation;
    wherein the first input diffraction grating of the first waveguide and second input diffraction grating of the second waveguide are offset from each other along the axis of propagation such that each input diffraction grating can be independently illuminated by one or more image projection systems.

16. The optical system of claim 15, wherein the first and second waveguides further comprise first and second output diffraction gratings, respectively, for directing light from the respective waveguides towards the display exit pupil.

17. The optical system of claim 15, further comprising a single image projection system which illuminates the first input diffraction grating with the first set of optical wavelengths of the image light, and which illuminates the second input diffraction grating with the second set of wavelengths of the image light.

18. The optical system of claim 17, wherein the image projection system comprises a Digital Micromirror Device (DMD), a first light source for emitting the first set of optical wavelengths of the image light, and a second light source for emitting the second set of optical wavelengths of the image light.

19. The optical system of claim 18, wherein the first and second light sources each illuminate a whole area of the DMD, and wherein the first and second light sources illuminate the DMD at mutually exclusive angles to a plane of DMD mirrors.

20. The optical system of claim 15, further comprising a first image projection system which illuminates the first input diffraction grating with the first set of optical wavelengths of the image light, and a second image projection system which illuminates the second input diffraction grating with the second set of wavelengths of the image light.

* * * * *